United States Patent
Nakai et al.

(12) 
(10) Patent No.: US 6,242,546 B1
(45) Date of Patent: Jun. 5, 2001

(54) PROCESS FOR PRODUCING VINYL POLYMERS

(75) Inventors: Toru Nakai; Takesi Asada, both of Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/026,745

(22) Filed: Feb. 20, 1998

(30) Foreign Application Priority Data

Feb. 24, 1997 (JP) .................................................... 9-056933

(51) Int. Cl.$^7$ ................................. C08F 2/38; C08F 12/02
(52) U.S. Cl. .......................... 526/211; 526/204; 526/220; 526/346
(58) Field of Search ............................... 526/83, 204, 211, 526/220, 346, 303.1, 317.1, 328, 330, 341; 525/259

(56) References Cited

U.S. PATENT DOCUMENTS

| | | | | |
|---|---|---|---|---|
| 3,148,225 | * | 9/1964 | Albert | ............................. 526/211 X |
| 3,222,334 | * | 12/1965 | Demme | .................................. 526/83 |
| 5,384,372 | * | 1/1995 | Lattime | .................................. 526/83 |
| 5,464,908 | * | 11/1995 | Sato et al. | ....................... 526/307.1 X |

OTHER PUBLICATIONS

Williams, Polymerizations in Emulsion, Polymer Processes, C.E. Schildknecht (ed.), Interscience, pp. 111–117, 141–144, Feb. 1956.*

* cited by examiner

*Primary Examiner*—Fred Teskin
(74) *Attorney, Agent, or Firm*—Townsend and Townsend and Crew LLP

(57) ABSTRACT

The present invention provides a process for producing a vinyl polymer characterized in that, in a radical polymerization of a vinyl monomer, a substituted hydroxylamine represented by a general formula:

(1)

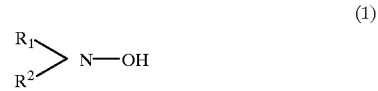

in which $R_1$ and $R_2$ represent hydrogen, a (substituted) aliphatic hydrocarbon group having one or more carbon atom(s) or an aromatic hydrocarbon group) and/or general formula:

(2)

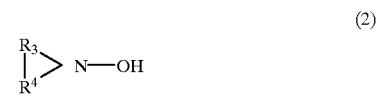

(in which $R_3$ and $R_4$ represent a (substituted) aliphatic hydrocarbon group having one or more carbon atom(s) is added. A radically polymerized vinyl polymer having a high molecular weight and a restrained molecular weight distribution can be obtained by the process of the present invention, even under a polymerization condition at a high temperature. The present invention provides, therefore, a process enabling to produce vinyl polymers which promise to have practical properties such as appearance, mechanical properties and heat resistance useful as materials for various moldings and coatings. Thus, the industrial and technical value of the present invention is extremely high.

9 Claims, No Drawings

PROCESS FOR PRODUCING VINYL POLYMERS

BACKGROUND OF THE INVENTION

1. Field of the Invention

The present invention relates to a method of radical polymerization of a vinyl monomer in the presence of a specific substance, and particularly, to a process for efficiently producing a vinyl polymer which has a high molecular weight desirable for practical properties such as mechanical properties, heat resistance and the like, and which has controlled molecular weight distribution.

2. Description of the Prior Art

In conventional radical polymerization, the molecular weight of the produced polymer strongly depends on the polymerization temperature, that is, the molecular weight of the polymer obtained is restricted by the polymerization temperature. Although the polymerization temperature is typically lowered in order to achieve a high molecular weight, decrease in polymerization temperature will elongate the polymerization time and increase the amount of remaining monomer. It becomes, therefore, difficult to effect an efficient production. Similarly, although the polymerization temperature is typically elevated in order to achieve a low molecular weight, increase in polymerization temperature will so accelerate the polymerization rate that is becomes difficult to control the reaction. For these reasons, there is a wide need for a polymerization method of freely controlling the molecular weight in a radical polymerization.

As an attempt to control the molecular weight in a radical polymerization, Tatemoto et al. have reported that radical polymerization of a fluorine-containing monomer such as tetrafluoroethylene proceeds in a manner like living polymerization in the presence of an iodine compound such as $CF_3)_2CF$-I (Shozo Tatermoto, *Koubunshi-Ronbun-Shu*, 49, 765 (1992)). Likewise, Otsu et al. have found that, when certain sulfur compounds were used, radical polymerization of styrene or the like occurred under light irradiation and that the extent of conversion and the molecular weight of the produced polymer increased with the time (J. Polym. sci.; part A; *polym. chem.*, 32, 2911 (1994)). According to these methods, it is possible to control the molecular weight in a considerably wide range. However, these methods lack universality because they require a special polymerization initiator or a use of limited kinds of monomer.

In anionic polymerization, a precise control of the molecular weight is possible by a polymerization method called living polymerization. Recently, it has also become popular to research a polymerization system which enables living polymerization in radical polymerization. For example, it has been shown in Japanese Patent Publication No. 94-199916 A that, by using a radical polymerization initiator such as benzoly peroxide together with a stable free radical agent such as 2,2,6,6-tetramethyl-piperidinyloxy (TEMPO), a living-like polymerization of styrene can be achieved. According to this method, by selecting a polymerization condition, the molecular weight of the polymer obtained will depend not only on the polymerization temperature but also on the amounts of the initiator and the stable free radical agent used, so that one can control the molecular weight by those amounts to a certain extent.

Thus, when the above method is used, one can obtain a resin having a controlled molecular weight. However, this method has a drawback that the reaction rate in this method is so slow that it takes considerably more time compared with the usual radical polymerization to reach a high extent of conversion. In addition, coloration of the obtained polymer may sometimes occur depending on the reaction condition. Furthermore, TEMPO requires special attention in its handling and storage because it exists in radical state, and it is also very expensive. This method has thus some shortcomings that, for example, it requires more production costs compared with the conventional methods.

In view of such a situation, the present inventors have concentrated their efforts on controlling the radical reaction of vinyl monomer with the aim of increasing productivity and improving practical physical properties of radically polymerized vinyl polymers. In result, we have found by chance a method for obtaining a vinyl polymer having a high molecular weight and a restrained molecular weight distribution while retaining a high polymerization rate by including a specific substituted alkylhydroxylamine in the polymerization system, and thus completed the present invention.

SUMMARY OF THE INVENTION

The present invention provides a process for producing a vinyl polymer characterized in that, in a radical polymerization of a vinyl monomer, a substituted hydroxylamine represented by a general formula:

(1)

(in which $R_1$ and $R_2$ represent hydrogen, a (substituted) aliphatic hydrocarbon group having one or more carbon atom(s) or an aromatic hydrocarbon group) and/or a general formula:

(2)

(in which $R_4$ and $R_4$ represent a (substituted) aliphatic hydrocarbon group having one or more carbon atom(s)) is added.

DETAILED DESCRIPTION OF THE PREFERRED EMBODIMENTS

The present invention is described below in more detail.

In each of $R_1$ and $R_2$ of the general formula (1) of the present invention, the aliphatic hydrocarbon group may include, for example, methyl, ethyl, isopropyl, t-butyl, butyl and the like group, and the aromatic hydrocarbon group may include, for example, phenyl, benzyl and the like group.

Similarly, —$R_3$—$R_4$— in the general formula (2) may include a divalent (substituted) aliphatic hydrocarbon group corresponding to those groups in the general formula (1) such as —$CH_2CH_2$—, —$CH_2CH_2CH_2CH_2$—, —$C(CH_2)_2CH_2$—$C(CH_2)_2CH_2$—, —$CH_2CH_2CH_2CH_2$—$CH_2CH_2CH_2CH_2$—, or the like.

Furthermore, the hydrocarbon groups in the above general formulas (1) and (2) may optionally be substituted, and the substituent may include, for example, an aliphatic hydrocarbon such as a methyl or ethyl group, an aromatic hydrocarbon such as a phenyl group, halogen, a halogenated hydrocarbon, a carbonyl group, a hydroxy group, an amino group, and the like.

In the present invention, the substance represented by the general formula (1) (substituted hydroxylamine) may include dimethylhydroxylamine, diethylhydroxylamine, isopropylhydroxylamine, dibenzylhydroxylamine and the like.

In the present invention, the substance represented by the general formula (2) may include N-hydroxylmaleimide, N-hydroxylsuccinimide, N-hydroxylphthalimide and the like.

In the present invention, although the radical polymerization may be initiated by any of the known methods, for example, using an initiator, heat light or radioactive rays, it is preferable to use an initiator. Although there is no special restriction on the ratio of the substance represented by the above general formulas (1) and (2) (substituted hydroxylamine) used to the radical polymerization initiator, it is preferable to use a mole ratio between the substance represented by the above general formulas (1) and (2) and the radical polymerization initiator at 0.01/1–100/1 (substance represented by the above general formulas (1) and (2)[substituted hydroxylamine]/radical polymerization initiator), more preferably at 0.1/1–10/1, and particularly preferably at 0.1/1–1.0/1. At a mole ratio of the substance represented by the above general formula (1) and (2) to the radical polymerization initiator below 0.01/1, it will be difficult to control the molecular weight and molecular weight distribution, while at a mole ratio above 100/1, the polymerization rate will decrease, There is no special restriction on the vinyl monomer used in the present invention, and it may be exemplified by aromatic vinyl compounds, $\alpha,\beta$-unsaturated carboxylic acids, $\alpha,\beta$-unsaturated carboxylic acid esters, $\alpha,\beta$-unsaturated carboxylic amides, $\alpha,\beta$-unsaturated nitriles, vinyl carboxylates, vinyl halides, vinylidene halides, conjugated dienes and the like compounds capable of radically polymerizing.

As an aromatic vinyl compound, although styrene is typically used, other aromatic vinyl compounds, for example, an alkyl-substituted styrene such as o-methylstyrene, p-methylstyrene, m-methylstyrene, 2,4-dimethylstyrene, p-ethylstyrene, p-t-butylstyrene, $\alpha$-methylstyrene or $\alpha$-methyl-p-methylstyrene, and an halogenated styrene such as o-chlorostyrene or p-chlorostyrene may also be used. A preferable aromatic vinyl compound includes, for example, styrene, $\alpha$-methylstyrene and p-methylstyrene, and styrene is especially preferable.

The $\alpha,\beta$-unsaturated carboxylic acid may include acrylic acid, methacrylic acid and the like. The $\alpha,\beta$-unsaturated carboxylic acid ester may include, for example, alkyl arcylates such as methyl acrylate, ethyl acrylate and n-butyl acrylate, alkyl methacrylates such as methyl methacrylate, ethyl methacrylate and butyl methacrylate, and derivatives thereof. The $\alpha,\beta$-unsaturated carboxylic amide may include, for example, acrylamide, methacrylamide, and derivatives thereof. The $\alpha,\beta$-unsaturated nitrile may include acrylonitrile, methacrylonitrile, $\alpha$-chloroacrylonitrile and the like. The vinyl carboxylates may include vinyl acetate, vinyl propionate and the like. The vinyl halide may include vinyl fluoride, vinyl chloride, vinyl bromide, vinyl iodide and the like. The vinylidene halide may include vinylidene fluoride, vinylidene chloride, vinylidene bromide, vinylidene iodide and the like. The conjugated diene compound may include butadiene, isoprene, chloroprene, piperidene, 1-chlorobutadiene and the like.

There is no special restriction on the radical polymerization initiator used in the present invention so far as it is capable of initiating radical polymerization, and the following compounds may be used, for example: organic peroxides, for example, peroxyketals such as 2,2-bis(4,4-di-t-butylperoxycyclohexyl)propane, 1.1-bis (t-butylperoxy)-3, 3,5-trimethylcyclohexane, 1,1-bis(t-butylperoxy) cyclohexane and n-butyl-4,4-bis(t-butylperoxy)valerate, hydroperoxides such as cumene hydroperoxide and diisopropylbenzene peroxide peroxide, dialkyl hydroperoxides such as t-butylcumyl peroxide and di-t-butyl peroxide, diacyl peroxides such as lauroyl peroxide and benzoly peroxide, peroxydicarbonates such as bis(t-butylcyclohexyl) peroxydicarbonate, and peroxyesters such as t-butyl peroxybenzoate, t-butyl peroxyacetate and 2,5-dimethyl-2, 5-di(benzoylperoxy)hexane; azo compounds such as azoisobutyronitrile, 2,2-azobis(2methylbutyronitrile, and 1,1-azobis(cyclohexane-1-carbonitrile); and peroxides such as benzoyl peroxide.

The radical polymerization initiator is preferably used at a mole ratio to vinyl monomer of 0.001/100–10/100 (radical polymerization initiator/vinyl monomer), and more preferably at a mole ratio of 0.01/100–1/100. This because, at a ratio of radical initiator to vinyl monomer below 0.001/100, it will be difficult to control the molecular weight, and at a mole ratio above 10/100, the polymerization will proceed so quickly that it becomes difficult to control the reaction.

There is no special restriction on the process of carrying out the polymerization of the present invention, and any of the usual polymerization modes such as bulk polymerization, suspension polymerization, bulk-suspension polymerization and solution polymerization may be used. In the case of solution polymerization, no more than 20 parts by weight of solvent may be included in the process with 100 parts by weight of vinyl monomer, if necessary. Solvent more than 20 parts by weight is disadvantageous because it will decrease the polymerization rate and productivity.

There is no special restriction on the solvent included in the process so far as the monomer and the produced polymer are soluble in the solvent. An example of solvent may be toluene, ethylbenzene, methyl ethyl ketone, benzene or the like, and toluene or ethylbenzene is especially preferred because their boiling points are close to the polymerization temperature. The above solvents may be used alone or in combination.

Furthermore, according to the process of the present invention, the molecular weight can be controlled by the amounts of the initiator and the monomer as well as the extent of conversion, so that the polymerization can be conducted in a very simple mode. Furthermore, according to the process of the present invention the molecular weight can be controlled by the amounts of the initiator and substance represented by the above general formula (1) or (2). It is, therefore, very easy to industrialize the present invention. The process according to the present invention may be carried out in a continuous mode or in batch.

The polymerization temperature at which the present invention operates is typically 60° C., and preferably 90° C.–150° C. At a temperature below 60° C., the reaction rate will be too low for an industrial production process, while at a temperature above 160° C. side reactions during the polymerization will occur to an extent not negligible, rendering the reaction control difficult.

When a stricter control is required in carrying out the present invention, a compound which has a function controlling heat polymerization may be used, if necessary. Among the compounds having such a function are, for example, phenylphosphonic acid, D, L-camphor-10-sulfonic acid, p-toluenesulfonic acid, 2-fluoro-1-methylpyridinium and the like.

When a thermoplastic resin is produced by the process of the present invention, admixtures, stabilizers or the like agents usually used may be added. For example, in the case of styrene-based thermoplastic resins, a lubricant such as mineral oil, silicone oil, zinc stearate, calcium stearate, or ethylenebisstearylamide, an oxidation inhibitor such as a phenolic or phosphorus antioxidant, a UV absorbent, and a colorant may be added during or after the polymerization.

The present invention will be further illustrated by the following Examples to which the present invention is not restricted.

EXAMPLES

As described below, the polymers of Examples 1–7 and References 1–2 were subjected to the following measurements (1) and (2), and the results are summarized in Table 1.

(1) Measurement of conversion

The extent of conversion was calculated by gas-chromatographically quantifying the amount of remaining monomer in the reaction solution sampled at a given interval during the reaction.

(2) Measurement of the molecular weight

For the polymer in the reaction solution sampled at a given interval during the reaction, the molecular weight was measured according to a GPC method using a GPC (LC-10A) manufactured by SHIMADZU CORPORATION and GPC columns (three KF-806L columns in tandem) manufactured by Showa Denko K. K.

Unless otherwise indicated, the polymerization reaction was carried out under nitrogen stream in a polymerization apparatus in which a reactor having 20 L inner volume equipped with an agitator was connected to a biaxial extruder equipped with a vent line. The start time of the reaction defined as the point when the temperature reached 95° C.

Example 1

A stock solution consisting of 150 mol of styrene, 0.3 mol of benzoyl peroxide and 0.15 mol of diethylhydroxylamine was introduced into the reactor, and heated with stirring at 95° C. for 3.5 hours. After raising the temperature to 130° C. stirring was continued for additional 4.5 hours to synthesize the polymer. After removing remaining monomer polystyrene was recovered from the biaxial extruder to obtain the polymer of Example 1.

Example 2

A stock solution consisting of 150 mol of styrene, 0.3 mol of benzoyl peroxide and 0.09 mol of diethylhydroxylamine was introduced into the reactor, and polymerized at 95° C. for 3 hours. Then, the polymer of Example 2 was obtained by following the same procedures as those in Example 1.

Example 3

A stock solution consisting of 150 mol of styrene, 0.3 mol of benzoyl peroxide and 0.21 mol of diethylhydroxylamine was introduced into the reactor, and the polymer of Example 3 was then obtained by following the same procedures as those in Example 1.

Example 4

A stock solution consisting of 150 mol of styrene, 0.3 mol benzoyl peroxide, 0.15 mol of diethylhydroxylamine and 0.3 mol of camphorsulfonic acid was introduced into the reactor, and the polymer of Example 4 was then obtained by following the same procedures as those in Example 1.

Example 5

A stock solution consisting of 150 mol of styrene, 0.3 mol of benzoyl peroxide and 0.15 mol of diethylhydroxylamine was introduced into the reactor, and polymerized at 130° C. for 6 hours. Then, the polymer of Example 5 was obtained by following the same procedures as those in Example 1.

Example 6

A stock solution consisting of 150 mol of styrene, 0.15 mol of benzoyl peroxide and 0.075 mol of diethylhydroxylamine was introduced into the reactor, and the polymer of Example 6 was then obtained by following the same procedures as those in Example 1.

Example 7

A stock solution consisting of 150 mol of styrene, 0.15 mol of benzoyl peroxide and 0.075 mol of N-hydroxyphthalimide was introduced into the reactor, and the polymer of Example 6 was then obtained by following the same procedures as those in Example 1.

Reference 1

The polymer of Reference 1 was obtained by following the same procedures as those in Example 1 with the exceptions that a stock consisting of 150 mol of styrene and 0.3 mol of benzoyl peroxide was introduced into the reactor and that the reaction was stopped after 2 hours at 130° C.

Reference 2

The polymer of Reference 2 was obtained by following the same procedures as those in Example 1 with the exceptions that a stock solution consisting of 150 mol of styrene, 0.3 mol of benzoyl peroxide and 0.36 mol of 2,2,6,6-tetramethyl-1-piperidinyloxy was introduced into the reactor and that the polymerization time was 80 hours.

Effects of the Invention

As described above, a radically polymerized vinyl polymer having a high molecular weight and a controlled molecular weight distribution can be obtained by the process of the present invention, even under a polymerization condition at a high temperature. The present invention provides, therefore, a process enabling to produce vinyl polymers which promise to have practical properties such as appearance, mechanical properties and heat resistance useful as materials for various moldings and coatings. Thus, the industrial and technical value of the present invention is extremely high.

TABLE 1

| Example | Reaction Time (h) | Conversion (%) | $Mn \times 10^{-4}$ | $Mw \times 10^{-4}$ | Mw/Mn |
|---|---|---|---|---|---|
| Example 1 | 2 | 21.0 | 4.06 | 6.62 | 1.53 |
|  | 4 | 40.4 | 5.34 | 7.58 | 1.36 |
|  | 8 | 74.6 | 7.80 | 10.45 | 1.30 |
| Example 2 | 1 | 31.2 | 3.36 | 5.21 | 1.52 |
|  | 2 | 54.6 | 4.23 | 6.55 | 1.55 |
|  | 3 | 70.2 | 5.33 | 8.04 | 1.51 |
| Example 3 | 2 | 11.7 | 4.87 | 7.89 | 1.62 |

TABLE 1-continued

| Example | Reaction Time (h) | Conversion (%) | Mn × 10⁻⁴ | Mw × 10⁻⁴ | Mw/Mn |
|---|---|---|---|---|---|
|  | 4 | 18.2 | 5.86 | 9.02 | 1.54 |
|  | 6 | 42.5 | 7.08 | 10.55 | 1.49 |
|  | 8 | 80.8 | 8.81 | 12.51 | 1.42 |
| Example 4 | 2 | 31.6 | 4.13 | 7.31 | 1.77 |
|  | 4 | 58.1 | 5.69 | 9.39 | 1.65 |
|  | 8 | 87.9 | 6.74 | 9.77 | 1.45 |
| Example 5 | 1 | 12.4 | 2.40 | 4.82 | 2.01 |
|  | 3 | 45.3 | 5.22 | 8.87 | 1.70 |
|  | 6 | 88.6 | 7.68 | 12.60 | 1.64 |
| Example 6 | 2 | 18.5 | 6.21 | 10.43 | 1.68 |
|  | 4 | 42.7 | 12.77 | 19.66 | 1.54 |
|  | 8 | 79.9 | 17.20 | 29.58 | 1.42 |
| Example 7 | 2 | 10.1 | 5.61 | 10.22 | 1.82 |
|  | 4 | 20.4 | 8.94 | 15.65 | 1.75 |
|  | 8 | 55.7 | 15.26 | 26.09 | 1.71 |
| Reference 1 | 0.5 | 54.8 | 4.75 | 15.44 | 3.25 |
|  | 1 | 70.2 | 4.44 | 13.01 | 2.93 |
|  | 2 | 89.4 | 5.26 | 13.26 | 2.52 |
| Reference 2 | 20 | 22.1 | 0.22 | 10.50 | 1.83 |
|  | 40 | 43.6 | 0.51 | 9.77 | 1.28 |
|  | 80 | 70.5 | 0.80 | 11.80 | 1.27 |

What is claimed is:

1. A process for producing a vinyl polymer from a vinyl monomer by radical polymerization, said process comprising the step of:

including in the polymerization system a hydroxylamine represented by a general formula (1):

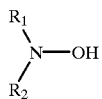

(1)

wherein in formula (1), $R_1$ and $R_2$ independently are selected from the group consisting of hydrogen, substituted aliphatic hydrocarbon groups having one or more carbon atoms and aromatic hydrocarbon groups; and/or general formula (2):

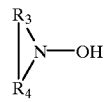

(2)

wherein in formula (2), $R_3$ and $R_4$ independently are substituted aliphatic hydrocarbon groups having one or more carbon atoms;

wherein the radical polymerization is carried out by any mode selected from the group consisting of bulk polymerization, suspension polymerization, and solution polymerization.

2. The process of claim 1 wherein the radical polymerization is carried out using a radical polymerization initiator.

3. The process of claim 2 wherein the mole ratio of the radical polymerization initiator to the vinyl monomer ranges from 0.001/100 to 10/100.

4. The process of claim 2 wherein the mole ratio of the substituted hydroxylamine to the radical polymerization initiator ranges from 0.01/1 to 100/1.

5. The process of claim 1 wherein the vinyl monomer is an aromatic compound.

6. The process of claim 1 wherein the hydroxylamine represented by formula (1) comprises at least one compound selected from the group consisting of dimethylhydroxylamine, diethylhydroxylamine, isopropylhydroxylamine, and dibenzylhydroxylamine.

7. The process of claim 1 wherein the hydroxylamine represented by formula (2) comprises at least one compound selected from the group consisting of N-hydroxylmaleimide, N-hydroxylsuccinimide, and N-hydroxylphthalimide.

8. The process of claim 1 wherein the hydroxylamine is present in the polymerization system from the beginning of the polymerization.

9. The process of claim 1 wherein the vinyl monomer comprises at least one compound selected from the group consisting of aromatic vinyl compounds, α,β-unsaturated carboxylic acids, α,β-unsaturated carboxylic acid esters, α,β-unsaturated carboxylic amides, α,β-unsaturated nitriles, vinyl carboxylates, vinyl halides, vinylidene halides, and conjugated dienes.

* * * * *